C. A. XARDELL.
COMPARTMENT TANK.
APPLICATION FILED JAN. 9, 1919.
1,310,516.
Patented July 22, 1919.
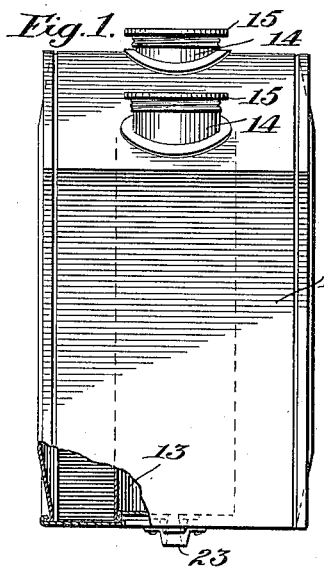
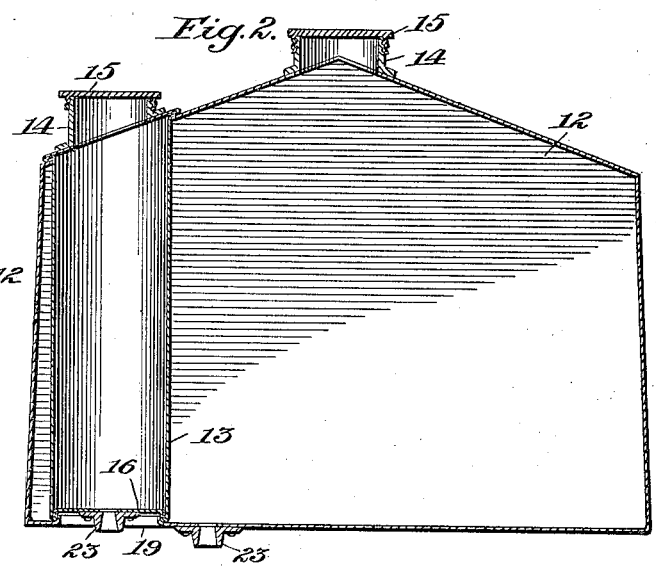
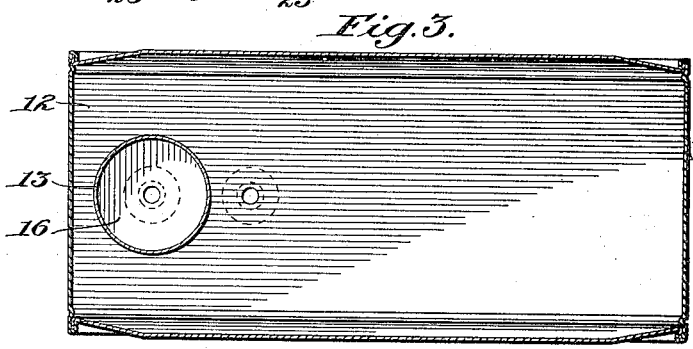
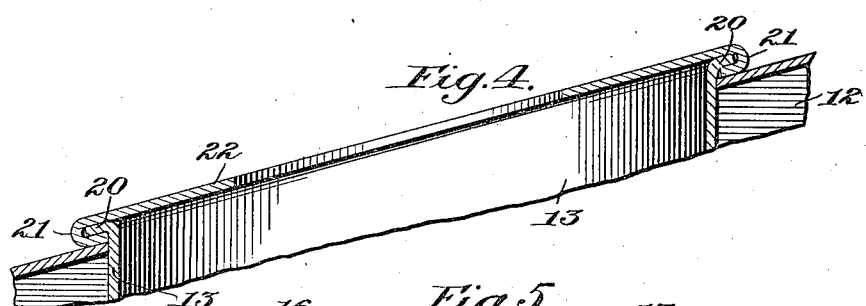
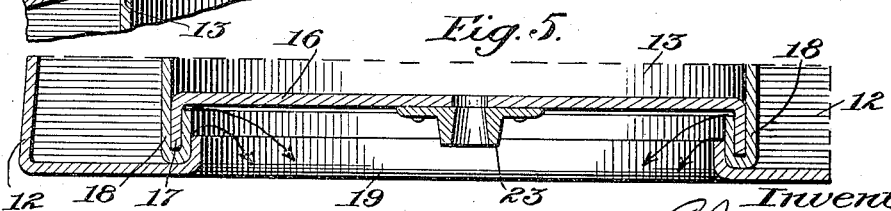
Inventor:
Charles A. Xardell,
by Calvert Calvert
Attys.

UNITED STATES PATENT OFFICE.

CHARLES A. XARDELL, OF UTICA, NEW YORK.

COMPARTMENT-TANK.

1,310,516.     Specification of Letters Patent.     Patented July 22, 1919.

Application filed January 9, 1919. Serial No. 270,312.

*To all whom it may concern:*

Be it known that I, CHARLES A. XARDELL, a citizen of the United States, residing at Utica, in the county of Oneida and State of New York, have invented or discovered certain new and useful Improvements in Compartment-Tanks, of which the following is a specification, reference being had therein to the accompanying drawings.

This invention relates to a double compartment or combination tank adapted to contain two different liquids, such as gasolene or kerosene, or gasolene and a lubricating oil, and the tank is primarily intended for automobile and tractor use, but is also adapted for other purposes. These double compartment or combination tanks have heretofore been constructed simply by putting in partitions, but this has proven unsatisfactory, as during use, owing to vibration and other causes, the joints sometimes become loosened so that there is a leakage from one compartment to the other, with the added disadvantage that when this takes place it is practically impossible to locate or repair leaky joints without destroying the tanks. The present invention provides a double compartment or combination tank of such construction that should any leakage occur at the joints between the compartments the drainage of liquid from either compartment will be to the outside of the tank, and the points of leakage may be readily discovered and repaired.

In the accompanying drawings Figure 1 is an end view, Fig. 2 a longitudinal section and Fig. 3 a horizontal section of the improved double compartment or combination tank. Figs. 4 and 5 are detail sectional views of the top and bottom joints, respectively, between the two compartments of the improved tank.

Referring to the drawing, 12 denotes the main tank into one part of which is fitted an auxiliary tank 13, herein shown as being of circular form, but this auxiliary tank, affording the second compartment, may be of any desirable form. The main and auxiliary tanks will preferably each be provided with a filling nozzle 14 having a screw cap closure 15. The sheet metal bottom 16 of the auxiliary tank 13 has a downturned peripheral flange 17 which is fitted into an inturned hooked portion 18 of the side wall of said auxiliary tank, said inturned hooked portion fitting against an upturned flange 19 formed on the bottom of the main tank 12. The joints afforded by the construction just referred to are of course tightly closed by solder, but the construction is such that should a leakage occur at these joints the liquid from the auxiliary tank will escape over the inner side of the inturned upwardly projecting part of the hooked portion 18, and the liquid from the main tank will escape outward over the upturned flange 19, as denoted by the arrows in Fig. 5, and thus any leakage from either tank will be to the outside and will therefore be prevented from entering the other tank, and the different liquids contained in the two tanks or the two compartments cannot become mixed by leakage.

The joint between the tops of the two compartments of the tank comprises an outwardly bent flange 20 at the top of the side wall of the auxiliary tank 13 and a downturned hooked portion 21 on the top plate 22 of the auxiliary tank, said downturned hooked portion fitting against the top of the main tank 12. By virtue of the construction just described it will be understood that should any leakage occur at the top joint between the two tanks or two compartments when either of these tanks or compartments is completely filled with liquid, or when the liquid is splashed up against the top when the tanks or compartments are only partly filled, the drainage will be to the outside, and a mixture of the different liquids in the two tanks or two compartments will therefore be avoided.

Each of the tanks is preferably provided at its bottom with a boss or outlet 23, as is usual in tanks of this construction.

From the foregoing it will be understood that the invention provides an improved combination or double compartment tank of such construction that should the joints between the compartments become weakened by vibration or use, so that leakage will occur, the drainage from either tank or compartment will be to the outside, thereby avoiding a mixture of the different liquids in the said tanks or compartments. Moreover the improved construction is such that any point of leakage can be easily discovered and be readily repaired by solder.

In the construction of the improved combination tank one tank or compartment is preferably entirely inclosed within the other, as herein shown, but a joint such as is shown at the right sides of Figs. 4 and 5 might be employed between two compartments of a tank in which the compartments were adjoining but in which one compartment was not inclosed within the other.

Having thus described my invention I claim and desire to secure by Letters Patent:

1. A double compartment or combination tank having a bottom joint, between the compartments, consisting of a downturned flange on the bottom plate of the auxiliary tank or compartment, an inturned hooked portion at the bottom of the side wall of said auxiliary tank or compartment and in which hooked portion said flange is entered, and an upturned flange at the bottom of the main tank or compartment and against which upturned flange said inturned hooked portion closely fits.

2. A double compartment or combination tank having two compartments, one inclosed within the other, and having a bottom joint, between the compartments, consisting of a downturned flange on the bottom plate of the auxiliary tank or compartment, an inturned hooked portion at the bottom of the side wall of said auxiliary tank or compartment and in which hooked portion said flange is entered, and an upturned flange at the bottom of the main tank or compartment and against which upturned flange said inturned hooked portion closely fits.

3. A double compartment or combination tank having a bottom joint, between the compartments, consisting of a downturned flange on the bottom of one compartment, an inturned hooked portion at the bottom of the side wall of said compartment and in which hooked portion said flange is entered, and an upturned flange at the bottom of the other compartment and against which upturned flange said inturned hooked portion closely fits.

In testimony whereof I affix my signature.

CHARLES A. XARDELL.

Copies of this patent may be obtained for five cents each, by addressing the "Commissioner of Patents, Washington, D. C."